(12) United States Patent
Ariano

(10) Patent No.: US 8,196,347 B2
(45) Date of Patent: Jun. 12, 2012

(54) PROCESS FOR CONTROLLING GRAPEVINE RIPENING AND RELATIVE PIECE OF EQUIPMENT

(76) Inventor: Franco Ariano, Cattolica (IT)

( * ) Notice: Subject to any disclaimer, the term of this patent is extended or adjusted under 35 U.S.C. 154(b) by 0 days.

(21) Appl. No.: 12/725,214

(22) Filed: Mar. 16, 2010

(65) Prior Publication Data

US 2010/0180495 A1 Jul. 22, 2010

Related U.S. Application Data

(63) Continuation of application No. 12/304,979, filed as application No. PCT/IT2006/000853 on Dec. 18, 2006, now abandoned.

(30) Foreign Application Priority Data

Jun. 13, 2006 (IT) .............................. RN2006A0038

(51) Int. Cl.
*A01G 17/04* (2006.01)
(52) U.S. Cl. ............................ 47/58.1 FV; 47/46; 47/47
(58) Field of Classification Search ................ 47/44, 46, 47/47, 58.1 R, 58.1 FV; 248/201, 207
See application file for complete search history.

(56) References Cited

U.S. PATENT DOCUMENTS

| 5,144,768 | A | * | 9/1992 | Hiyama et al. | 47/46 |
| 5,349,780 | A | * | 9/1994 | Dyke | 47/47 |
| 6,378,245 | B1 | * | 4/2002 | Summers | 47/45 |
| 6,578,318 | B1 | * | 6/2003 | Clark | 47/58.1 FV |
| 6,604,320 | B1 | * | 8/2003 | Hsia | 47/47 |
| 6,631,584 | B1 | * | 10/2003 | Seinsevin | 47/44 |
| 2005/0044786 | A1 | * | 3/2005 | Mastronardi | 47/47 |
| 2005/0252076 | A1 | * | 11/2005 | Schloesser et al. | 47/46 |
| 2007/0113470 | A1 | * | 5/2007 | Mucci | 47/44 |
| 2008/0034649 | A1 | * | 2/2008 | Sanchez et al. | 47/44 |
| 2008/0190019 | A1 | * | 8/2008 | Hart | 47/47 |
| 2010/0229463 | A1 | * | 9/2010 | DeBruin | 47/46 |

FOREIGN PATENT DOCUMENTS

| CH | 638077 A5 | * | 9/1983 |
| GB | 947432 A | | 1/1946 |
| GB | 582830 A | | 11/1946 |

* cited by examiner

*Primary Examiner* — Rob Swiatek
*Assistant Examiner* — Lisa Tsang
(74) *Attorney, Agent, or Firm* — Browdy and Neimark, PLLC

(57) ABSTRACT

A process for controlling grapevine ripening comprises a step, to be implemented between the birth of the rachis (R) and harvesting of the bunch (G), in which rachis (R) supporting means (1) are applied, designed to at least counterbalance the weight of the flowers and fruit developing on the rachis (R), allowing the rachis (R) to grow according to its original direction. A piece of equipment for controlling grapevine ripening, in accordance with the above-mentioned process, comprises a structure (2) fixed to the ground and rachis (R) supporting means (1) which can be connected to the fixed structure (2).

3 Claims, 2 Drawing Sheets

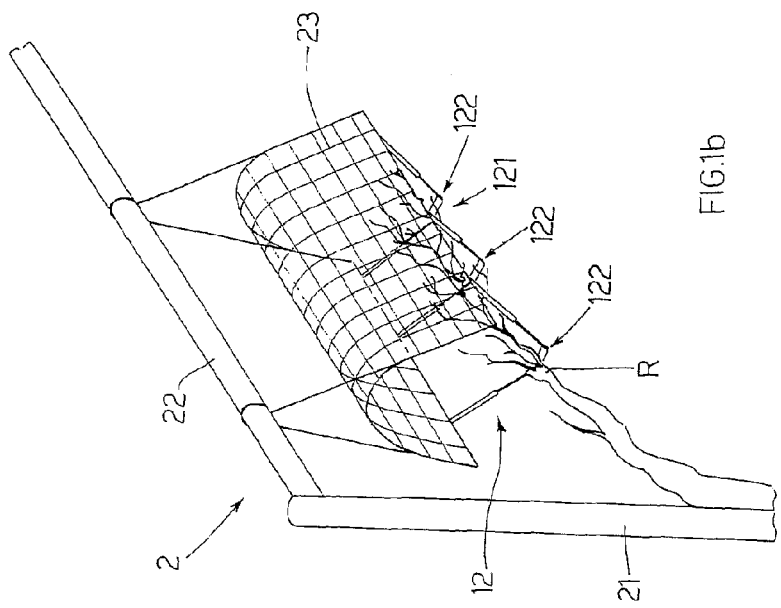
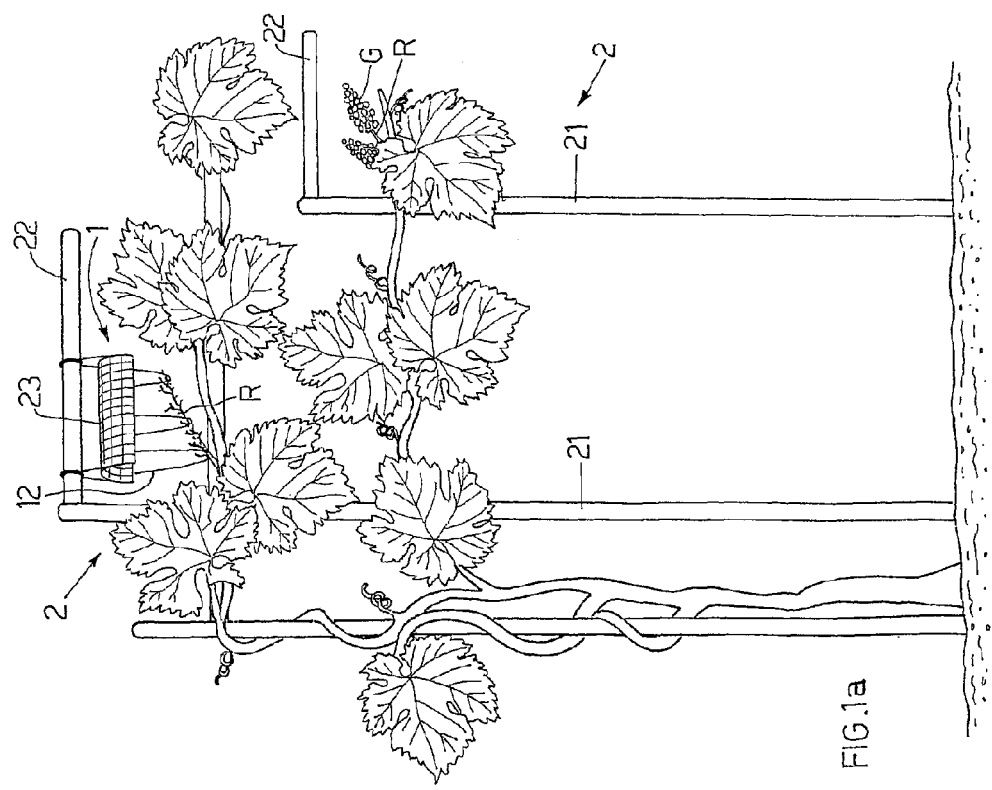
Fig.1
Fig.1a
Fig.1b

PROCESS FOR CONTROLLING GRAPEVINE RIPENING AND RELATIVE PIECE OF EQUIPMENT

TECHNICAL FIELD

The present invention relates to a process for controlling grapevine ripening and a relative piece of equipment.

BACKGROUND ART

The great spread of vine growing has, over the years, made known to everyone how the quality of the grapes produced is affected by numerous factors, amongst which those with the greatest influence are certainly linked to the climatic and micro-climatic conditions in which the plant and the bunch develop.

However, while experience of climatic conditions, understood as an in-depth knowledge of the consequences linked to altitude, rainfall, humidity and other characteristic parameters of the regions in which the vine is grown, has generated numerous devices for treatment of the vine during its growth, less attention has been paid to the micro-climate, that is to say, what happens in the immediate vicinity of the bunch. In other words, no one ever thought to intervene in any way in the bunch growth process.

The natural evolution of bunch ripening is well known to experts and thoroughly described in numerous publications in the sector: first the buds form on the vine stem; when each bud opens a shoot emerges, on which there develop, at the nodes, first the leaves and then the rachises, which constitute the branched axes on which the grapes will develop, and from which the bunches of grapes take shape.

During the so-called floral structure step, on the rachis bunch-shaped inflorescences form which constitute the first stage of the bunch of grapes: after the flowering comes the so-called setting, during which the actual grapes form by transformation and swelling of the ovary of the flowers, then the grapes take on their definitive shape and the bunch acquires the features we all recognise. This is followed by harvesting, after which the leaves drop, close to winter.

Paying particular attention to the floral structure step, it may be seen that, while the naked rachis tended to develop upwards and, therefore, to take on a substantially vertical arrangement, from this moment and as the weight of the flowers (and subsequently the grapes) gradually increases, the rachis gradually bends downwards, until, when the bunch is ripe, the bending point is extremely close to the node from which the rachis originated. As is known, the sap which circulates in the plant tends to move upwards and its circulation is therefore hindered by the curvilinearity of the path it must follow to reach the end of the rachis during bunch ripening, that is to say, when due to the significant weight of the grapes, the rachis is bent downwards.

This difficulty in sap circulation may easily correspond firstly to a delay in bunch ripening and secondly to uneven ripening of the grapes, amongst which, in particular, those in the outer positions of the bunch may not fully ripen, because it is difficult for a suitable amount of sap to reach them.

Unevenness of the grapes makes it easier for parasites to attack the less healthy grapes, consequently penalizing the health of the entire bunch.

Finally, grapes in different conditions respond differently to treatments, making it practically impossible to identify operations which will benefit the entire bunch.

DISCLOSURE OF THE INVENTION

The aim of the present invention is, therefore, to eliminate the above-mentioned disadvantages. This aim is achieved by making the bunch grow as if it were unaffected by the weight of the grapes which cause the rachis to bend downwards.

The main advantage of the present invention is basically the fact that in this way the natural upward flow of sap is encouraged.

Therefore, improved and more even bunch ripening is achieved, the probability of attack by parasites is reduced and so the entire bunch is healthier and the plant responds better to the treatments applied to it.

BRIEF DESCRIPTION OF THE DRAWINGS

Further advantages and features of the invention are more evident in the detailed description which follows, with reference to the accompanying drawings, which illustrate a preferred embodiment without limiting the scope of the invention, in which:

FIG. 1 is a front view (FIG. 1a) and a perspective view of an enlarged detail (FIG. 1b) of a first embodiment of the invention;

DETAILED DESCRIPTION OF THE PREFERRED EMBODIMENTS OF THE INVENTION

Figure 2:
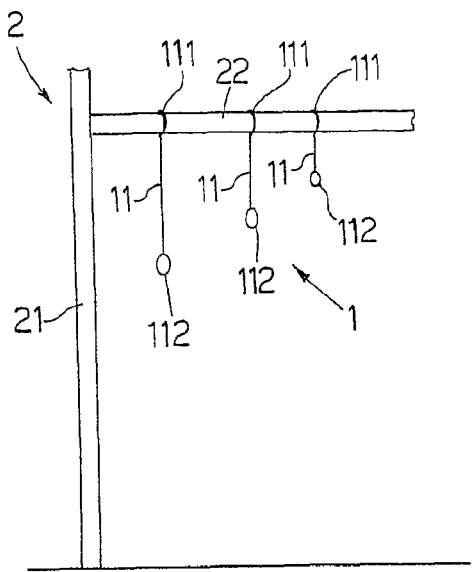
FIGS. 2 and 3 are schematic illustrations of two alternative embodiments of the invention.

As shown in the accompanying drawings, the present invention relates to a process for controlling grapevine ripening, characterised in that it comprises a step, between the birth of the rachis (R) and harvesting of the bunch (G), in which rachis (R) supporting means (1) are applied, designed to at least counterbalance the weight of the flowers and fruit developing on the rachis (R), allowing the rachis (R) to grow according to its original direction.

The piece of equipment for controlling grapevine ripening comprises at least a structure (2) fixed to the ground and rachis (R) supporting means (1), which can be connected to the fixed structure (2). Depending on the circumstances, said supporting means (1) may assume various configurations which are functionally equivalent to one another, whilst the fixed structure (2) comprises at least one upright (21) with at least one transversal projection (22), designed to support the rachis (R) supporting means (1). Considering that a large number of rachises (R) and therefore bunches (G) will simultaneously be treated in the same way, in practice the fixed structure (2) usually comprises numerous uprights (21), not illustrated in the accompanying drawings, connected to one another by transversal projections (22) preferably consisting of rigid or flexible elements, to which the rachis (R) supporting means (1) are preferably connected.

For example, in FIG. 2 the rachis (R) supporting means (1) comprise at least one linear element (11) having first means (111) for connection to the fixed structure (2) and second means (112) for connection to the rachis (R), designed to prevent the rachis from bending downwards. In this example, each of the linear elements (11) used has adjustable length, so that it can adapt to cover the distance between the rachis (R) to be supported and the fixed structure (2) at different points of the rachis (R). The first means (111) for connection can move relative to the fixed structure (2), so that they can adapt to the portion of rachis (R) to be supported, whilst the second means (112) for connection, in direct contact with the rachis (R), are appropriately made of a neutral material which does not alter the structure of the rachis (R) in any way, or the characteristics of the grapes with which it may come into contact.

In FIG. 1, the rachis (R) supporting means (1) comprise at least one "V"-shaped element (12), with means (121) for connection to a fixed structure (2). Each of the "V"-shaped elements (12), of which more than one may also be used for each rachis (R), comprises arms (122) with adjustable length, so as to adapt to the rachis (R) to be supported. The base of the "V", which is the zone designed to come into direct contact with the rachis (R), must also be made of neutral material for the reasons already indicated and considering that, as the bunch (G) grows, said base will be embedded in it, in contact with the grapes. Again the means (121) for connection are appropriately able to move relative to the fixed structure (2), so as to adapt to the rachis (R) to be supported. In this embodiment, a tight-woven protective element (23) is also illustrated, inserted between a projection (22) from the upright (21) and the supporting means (1), designed to protect the fruit from bad weather. The weave of the protective element (23), in particular, should be tight enough to prevent the passage of hail, but should allow the passage of air and light.

Figure 3:
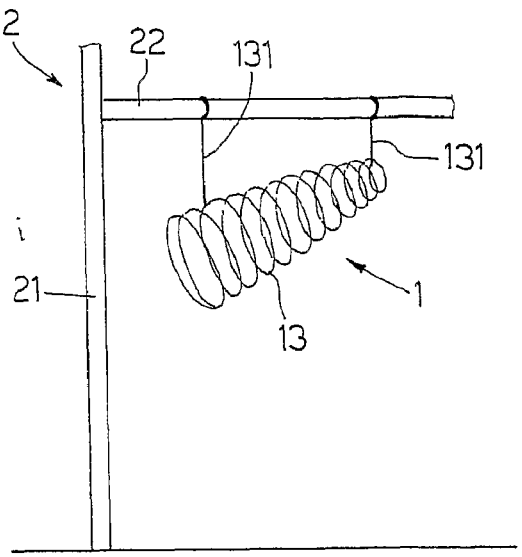

In FIG. 3, the rachis (R) supporting means (1) comprise at least one spiral element (13), having means (131) for connection to a fixed structure (2). As in the previous examples, the means (131) for connection can be adjusted and can move relative to the fixed structure (2), so as to adapt to the rachis (R) to be supported, whilst the spiral element (13) completely winds around the rachis (R), already having a shape similar to that of the bunch (G) which will form.

Figure 4:
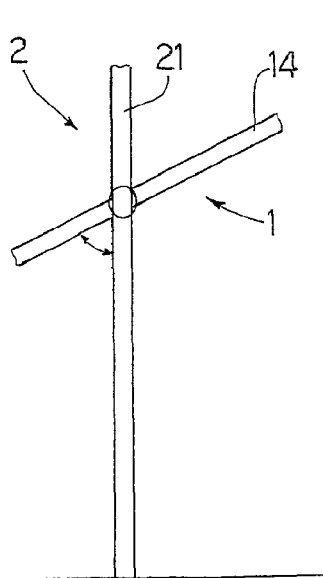
FIG. 4 is a schematic illustration of two alternative versions of another embodiment of the invention.

Finally, FIG. 4 schematically illustrates two situations in which the rachis (R) supporting means (1) comprise at least one straight element (14), pivoting at the fixed structure (2) so as to allow variation of the angle between the straight element and the structure. As in the other cases, the fixed structure (2) consists of an upright (21) and the straight element (14) with variable angling is positioned parallel with the rachis so as to follow the latter's direction of development.

The invention described may be modified and adapted without thereby departing from the scope of the inventive concept.

Moreover, all details of the invention may be substituted by technically equivalent elements.

Obviously, in practice modifications and/or improvements are possible, all covered by the claims herein.

The invention claimed is:

1. A process for controlling grapevine ripening, comprising
    a step, between the birth of a rachis (R) on a grapevine and harvesting of a bunch (G) of grapes, in which a rachis (R) supporting means (1), provided in a way to at least counterbalance the weight of flowers and fruit developing on the rachis (R), are applied to the rachis (R) so that the bunch (G) of grapes grows in an upward direction.

2. The process of claim 1 wherein, as a preliminary step, the rachis (R) supporting means is fixed on a support and is inclined in an upward direction from horizontal.

3. A process for controlling grape vine ripening by causing sap circulation to flow in an upward direction during grape ripening, comprising
    providing a structure (2) fixed to ground, and rachis (R) supporting means (1) connected to the fixed structure (2), the supporting means being adapted to support a grape vine at a rachis (R) to at least counterbalance the weight of flowers and grapes developing on the rachis (R),
    applying the supporting means (1) to the grape vine to support the rachis (R) so as to direct the rachis (R) in an upward direction, and
    maintaining the supporting means (1) in position to at least counterbalance the weight of grape clusters developing on the rachis (R) so that a bunch (G) of grapes grows in an upward direction,
    whereby inhibition of circulation of sap is minimized during bunch ripening, and grape ripening is made even and promoted.

\* \* \* \* \*